United States Patent [19]

Guigné

[11] Patent Number: 4,955,001

[45] Date of Patent: Sep. 4, 1990

[54] AREAL SOUND INTENSITY RECEIVER

[75] Inventor: Jacques Y. Guigné, St. John's, Canada

[73] Assignee: Nordco Limited, St. John's, Canada

[21] Appl. No.: 481,433

[22] Filed: Feb. 20, 1990

[51] Int. Cl.$^5$ ............................ G01S 3/80; G01H 3/12
[52] U.S. Cl. .................................... 367/118; 367/129; 73/646
[58] Field of Search .................. 367/136, 118, 13, 129; 73/646, 647

[56] References Cited

U.S. PATENT DOCUMENTS

| | | | |
|---|---|---|---|
| 4,119,942 | 10/1978 | Merklinger | 367/907 |
| 4,620,445 | 11/1986 | McKendree | 73/647 |

OTHER PUBLICATIONS

Rasmussen, Gunnar et al., "Intensity Measurements" *Inter-Noise* 83, 1983.
Rasmussen, Gunnar "Measurement of Vector Fields" *Senlis*, 1985.
Guigne, J. Y. et al., "A Concept for the Detection of Fatigue Cracks in Welded Steel Nodes" *Marine Technology*, vol. 18 (1987) No. 4.
Guigne, J. Y. et al., "Detection of In-Service Fatigue Damage in Offshore Structures Using Dynamic Acoustic Intensity Scanning" *Non-Destructive Testing* (Proc. 12th World Conference), Apr. 1989, pp. 478–483.
Guigne, J. Y. et al., "Acoustical Imaging Using a DAIS Technique for Non-Destructive Testing" *Acoustical Imaging*, vol. 17, 1989, pp. 237–246.

Primary Examiner—Thomas H. Tarcza
Assistant Examiner—Daniel T. Pihulic
Attorney, Agent, or Firm—Fetherstonhaugh & Co.

[57] ABSTRACT

A system of three or more hydrophone arrays are utilized to measure underwater areal sound intensity. The hydrophone arrays bound at least one plane through which an areal sound intensity measurement is desired. Each hydrophone array comprises three orthogonal pairs of hydrophones with coincident acoustic centers. The output of each hydrophone in the system is simultaneously sampled and the outputs processed to obtain a vectorial sound intensity representation at each of the hydrophone arrays from which a representation of the areal sound intensity across the noted plane may be derived.

9 Claims, 3 Drawing Sheets

AREAL SOUND INTENSITY RECEIVER

BACKGROUND OF THE INVENTION

Many offshore oil field developments utilize floating production systems consisting of semi-submersible units, shuttle tanker fleets and sub-sea wells/flowlines, because the oil and gas reserve sizes are not significantly high to favour the use of a massive gravity structure. The majority of these structures are entirely constructed of steel plates, beams and tubulars joined together by welding; they may have to operate in an environment frequented by drifting first-year or multi-year ice, mobile bergybits/growlers and extreme hostile waves. Consequently, they are subjected to considerable deterioration and damage due to corrosion fatigue cracking at the welded joints and impact with the drifting ice field or mobile ice masses. Furthermore, the commercial transport of oil and gas across ice-bound northern regions requires ice-transiting ships capable of breaking through 4–5 m thick ice and larger ice ridges; such ships are therefore subjected to impact stresses.

The recent disasters of Alexander Kielland, Ocean Ranger and Pier Alpha have heightened the need for accurate monitoring of the safety of these offshore structures. Known inspection procedures and techniques to detect and quantify cracks and defects at welded joints of offshore structures include diver assisted Magnetic Particle Inspection (MPI), Alternating Current Field Measurement (ACFM), Eddy Current (EC) and Ultrasonic Techniques. Current acoustical approaches for monitoring fatigue cracks are based on the measurement of sound pressure levels. These are scalar quantities and hence no directional information can be revealed. Further, all of the known techniques have been found to be limited in application because they must operate in the close vicinity of welded joints and become useless if positioned a short distance away from the zone of damage.

Accordingly there is a need for an improved technique for detecting corrosion fatigue and impact fatigue in structures.

SUMMARY OF THE INVENTION

The subject invention recognizes that intensity—which is a vector quantity indicative of the magnitude and direction of acoustic energy flow—would be an inherently better descriptor of active sound fields. This is for the following reasons. A sound field will have both active and reactive components. Ambient noise is predominantly reactive and tends to have low particle velocities. Vibrational energy radiated from structures forms active fields with high particle velocities. Consequently, signal-to-noise ratios have the potential for a gain of up to 20 dB through intensity mapping instead of pressure measurements because of the high particle velocities and directional nature of an active field over the reactiveness of noise environments.

Accordingly, the present invention provides a device for measuring the intensity of sound from an acoustic source in a medium comprising: at least three microphone arrays spaced from each other, each of said microphone arrays comprising six microphones configured as three orthogonal pairs of microphones; means for simultaneously sensing the output from each of said microphones in order to determine a real-time sound intensity vector at each of said microphone arrays; and means for providing an indication of the areal intensity of sound through a notional plane bounded by at least three of said at least three microphone arrays.

In another aspect there is provided a method of deriving a sound intensity vector field over an area in a medium comprising the steps of: simultaneously sensing sound pressure in the medium at a plurality of points comprising at least three clusters of points, each cluster of points configured as three orthogonal pairs of points wherein the mid-points of the three orthogonal pairs of points of a cluster are coincident; determining the sound intensity vector at the center of each of said clusters of points; and determining an indicating of the sound intensity vector field over an area bounded by at least three of said at least three clusters of points.

In the figures which represent example embodiments of the invention:

DETAILED DESCRIPTION

Figure 1:
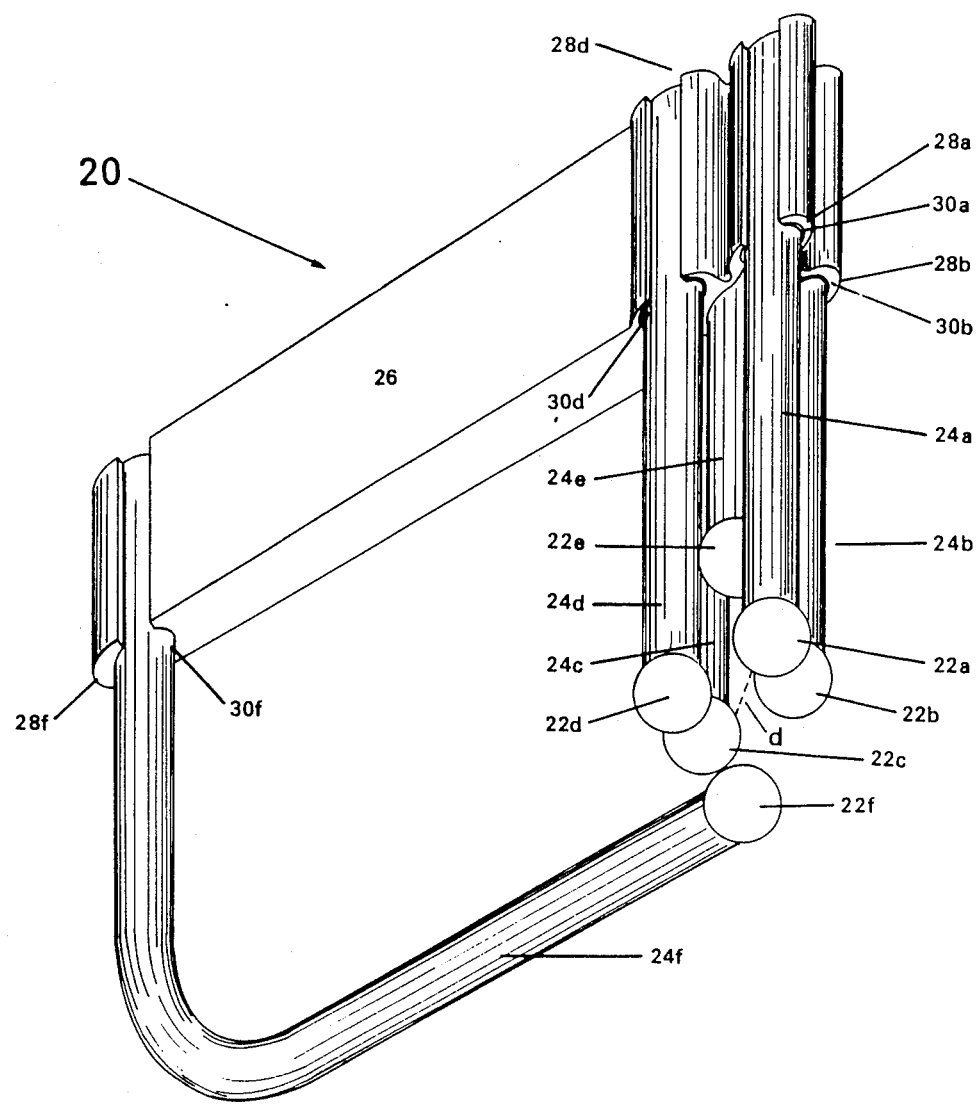
FIG. 1 is a perspective diagram of an array of hydrophones made in accordance with this invention.

The classic definition for sound intensity is a vector quantity that describes the net amount and direction of flow of acoustic power at a given point in space (where intensity is in W/m$^2$ and the intensity level is in dB re 1pW/m$^2$). It is well established and stated in physics that if the intensity vector I (the energy flow vector) is the net rate of flow of energy per unit area at the given position, then the acoustic power, W, passing through a surface, S is:

$$W = \int_S \vec{I} \cdot \vec{dS} \tag{1}$$

$$W = \int_S I_n \cdot dS \tag{2}$$

where $I_n$ is the vector component normal to the surface. In a medium without flow or bulk movement, the intensity vector I is equal to the time averaged product of the instantaneous pressure p(t) and the corresponding particle velocity $\vec{V}(t)$ at the same point. This is expressed mathematically as:

$$\vec{I} = \lim_{T \to \infty} \frac{1}{T} \int_{-T/2}^{+T/2} p(t) \cdot \vec{V}(t) dt \tag{3}$$

Hence the intensity vector component in a given direction $I_r$ is:

$$I_r = \lim_{T \to \infty} \frac{1}{T} \int_{-T/2}^{+T/2} p(t) \cdot v_r(t) dt \tag{4}$$

From Eulers equation we know that, for a sound field propagating in a fluid, the particle acceleration A is given by the ratio of the pressure gradient to the fluid density $\rho$:

$$A = \frac{1}{\rho} \frac{\partial p}{\partial r} \quad \text{(Eulers equation)} \qquad (5)$$

The particle velocity can thus be obtained by integrating the particle acceleration:

$$V_r = \frac{1}{\rho} \int \frac{\partial p}{\partial r} dt \qquad (6)$$

The pressure gradient is a continuous function which for two closely spaced microphones can be approximated using a finite difference method:

$$\frac{\partial p}{\partial r} = \frac{P_b - P_a}{\Delta r} \qquad (7)$$

where $P_a$ and $P_b$ are the pressures measured at the two microphones, and $\Delta r$ is the receiver spacing.

This gives an approximation for the pressure gradient at the center of the microphone pair. The pressure at this point is derived from the average pressure of the two microphones:

$$P = \frac{P_a + P_b}{2} \qquad (8)$$

Substituting expressions (6), (7) and (8) into (4) we find that intensity can in practice be computed from:

$$I_r = \frac{P_a + P_b}{2\rho\Delta r} \int (P_b - P_a) dt \qquad (9)$$

There are inherent limitations in measuring intensity using two closely spaced microphones and a finite pressure difference approximation for the derivation of the particle velocity.

The use of this technique in the measurement of sound intensity introduces a number of errors which limit the useful frequency range of the system. These errors can be synthesized into the following categories:
 (i) a finite difference approximation error at high frequencies,
 (ii) an error due to the phase mismatch when the phase difference between the two element positions is small, and
 (iii) a random error.

Errors can be minimized by optimizing the receiver array and its configuration, and by having high transducer performance in accordance with IEC, ISO and ANSI standards (e.g. ANSI S1.12 1967 type XL, M). Signal averaging, as dictated by the ambient background conditions, will substantially reduce the random error. For the detection of fatigue cracks, the application of a continuous calibration and a collective learning feedback diminishes the effect of errors and meets operational specifications and standards. Continuous optimization of the measurement system yields a high level of precision.

Equation (9) suggests the ability to obtain directional information. That is, if a source emits an acoustic intensity, I, in a direction which makes an angle, $\sigma$, with a notional line passing through the centers of the microphone pair then the intensity in the direction of the notional line, $I_r$, is related to I as follows:

$$I_r = I \cos \sigma \qquad (10)$$

Accordingly, an array of three orthogonal pairs of microphones, with the acoustic centers of the three orthogonal pairs coincident, is able to identify the direction and magnitude of an intensity vector impinging on the array.

The device 20 of FIG. 1 provides such an array adapted for underwater measurement. More particularly, a cluster of six hydrophones 22a, 22b, 22c, 22d, 22e, and 22f is arranged as three orthogonal pairs. That is, three pairs may be found such that a notional line through the center of the two hydrophones of each pair form three orthogonal lines. In FIG. 1, hydrophones 22a and 22c form one such pair, hydrophones 22b and 22d form a second such pair, and hydrophones 22e and 22f form the third such pair. The distance, d, between the centers of the hydrophones of each orthogonal pair of hydrophones is equivalent and the acoustic centers of the three orthogonal pairs of hydrophones in the array are coincident.

Each of the six hydrophones is spherical in shape. Each hydrophone is supported at one end of a hollow tube 24a, 24b, 24c, 24d, 24e, and 24f. The tubes are received by resilient C-shaped sections 28a through 28f of bracket 26 (28c and 28e are hidden in FIG. 1). Nylon pads 30a through 30f line the inside surface of the C-shaped sections (30c and 30e are hidden in FIG. 1). The connecting wires to the hydrophones pass through the centers of the hollow tubes 24a through 24f.

Reflections at the measuring device are a problem in underwater acoustic measurement. The device of FIG. 1 minimizes these as follows. Tubes 24a through 24f are made small to minimize reflections from the tubes. Energy that is absorbed by the tubes propagates toward the bracket 26 which acts as a sink; nylon pads 30a through 30f provide a mismatched impedance at the termination of the tubes which prevents reflection of the absorbed energy back toward the hydrophones 22a through 22f.

Figure 2:
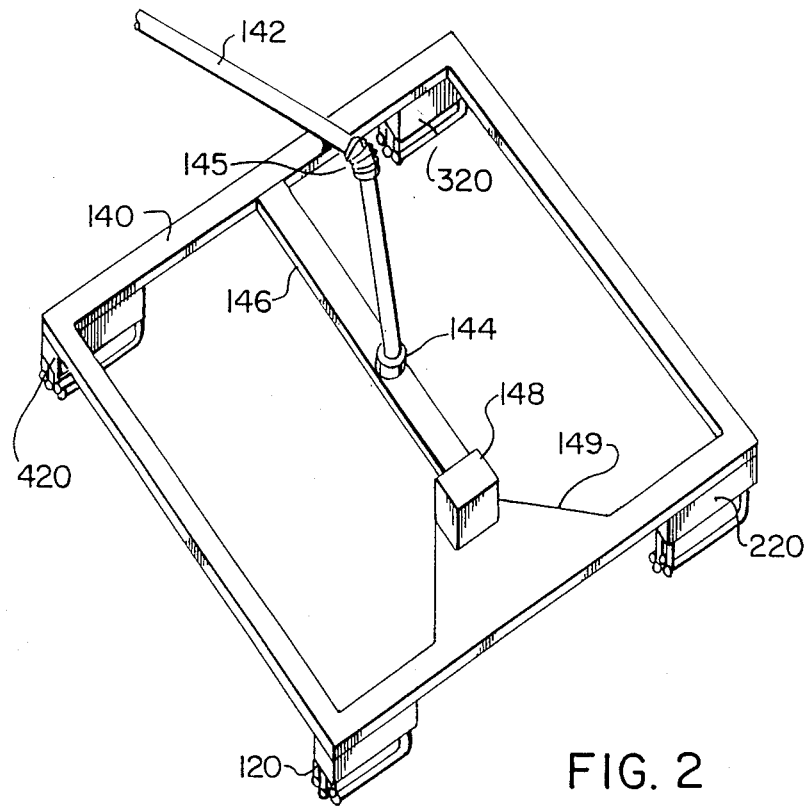
FIG. 2 is a perspective view of an apparatus for use as an areal sound intensity receiver incorporating four of the arrays of FIG. 1.

In FIG. 2, four FIG. 1 arrays 120, 220, 320, and 420 are supported at the four corners of the square platform 140. Rotatable end-effector 144 of articulated robot arm 142 is affixed to the central beam 146 of the platform. The robot arm is articulated at joint 145. An attitude and motion sensor 148 is supported by flared end 149 of central beam 146.

Figure 3:
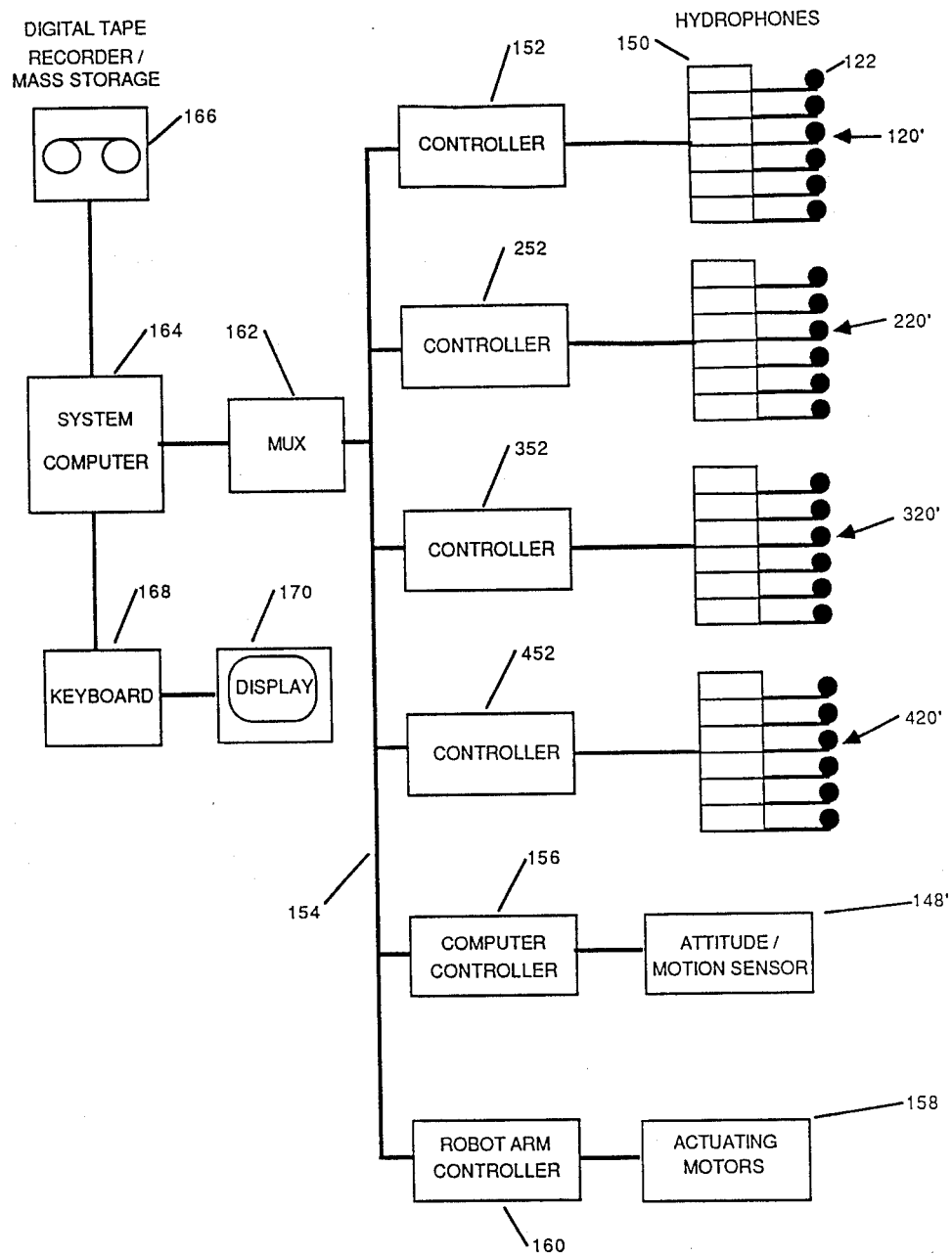
FIG. 3 is a block diagram of a system for the operation of the apparatus of FIG. 2.

The control system for the apparatus of FIG. 2 is shown in FIG. 3. The four FIG. 2 hydrophone arrays are illustrated schematically at 120', 220', 320', and 420'. A data collection circuit 150 is connected to the output of each hydrophone 122 of the system. The six data collection circuits associated with one array of hydrophones feed a controller. Thus there are four controllers 152, 252, 352, and 452, associated with the four arrays 120', 220', 320' and 420', respectively. The four controllers are connected to bus 154.

The attitude and motion sensor 148' is operatively connected to a computer controller 156 which is in turn connected to the bus 154. The actuating motors 158 of end-effector 144 and joint 145 (shown in FIG. 2), are connected to robot arm controller 160 which is in turn connected to bus 154. Bus 154 feeds multiplexer 162 and the multiplexer feeds computer 164. The computer 164 is connected to a mass storage device 166, a keyboard 168, and a display 170.

As energy propagates through a medium it can be redistributed as reflections, back-scatter and attenuation. The flexing of an object in the medium is displayed by the first two redistribution modes while fatigue cracking at nodes of the object is revealed by the absorption that occurs. Thus, an object in the medium can be considered an acoustic source. The areal sound intensity receiver of FIGS. 2 and 3 may be used to scan an underwater acoustic source, as follows.

Platform 140 is moved into a position proximate an object to be analyzed by selectively activating motors 158 associated with the robot arm 142 by way of control signals passed to robot arm controller 160 by the system computer via multiplexer 162 and bus 154.

Pressure waves propagating underwater impinge upon the hydrophones 122 and result in a signal indicative of the pressure passing to the data collection circuit 150 associated with each hydrophone. Under control of controllers 152, 252, 352, and 452, the data collection circuits simultaneously sample an analog signal from their respective hydrophones and convert it to a digital signal which is passed to the controllers. At the same time, signals are sampled by the attitude and motion sensors and passed to its computer controller 156. The attitude and motion sensors provide an indication of the degree of vibrational motion or varying attitude of the platform itself. These samplings may be repeated in order to obtain average readings. The timing of the sampling is controlled by the system computer 164. The samples are converted to intensity vectors at each controller 152, 252, 352, and 452. Because the acoustic centers of the hydrophones of each hydrophone array are coincident, the signals from the six hydrophones of each array may be converted into a vector measured at this acoustic center of the array. These vectors, along with attitude and motion information, are then passed to the system computer 164 through bus 154 and multiplexer 162. An indication of the intensity vector field within the square formed by the four hydrophone arrays is obtained by assuming a linear change between the four measured intensity vectors. As will be well understood to those skilled in the art, the power passing through the square formed by the four hydrophone arrays may be calculated from this intensity field.

As will be obvious to those skilled in the art, a greater number of FIG. 1 hydrophone arrays may be placed about the square platform to improve the accuracy of the apparatus of FIGS. 2 and 3.

As mentioned hereinbefore, intensity measurements screen out background noise. Thus, the intensity vectors will relate to pressure waves originating at the proximate object which is to be analyzed. This object may be, for example, the below water portion of a ship's hull, in which case, as the hull is scanned, any areal intensity measurement which shows a reduced intensity indicates fatigue cracking. The attitude and motion sensors provide an indication of the magnitude of the error in the readings.

The areal sound intensity receiver of FIGS. 2 and 3 may also be used as a passive sonar device in a reactive sound environment, as follows. Consider the underwater arctic environment where shifting ice contributes significant sound levels to the background noise. Conventional systems require a high degree of sensitivity to passively detect the sound emissions from a moving submersible object at a distance. However, sensitive detectors are susceptible to the constant noise bursts from the shifting ice. The dynamic range of a receiving system needs to be large to detect the low level sound emissions from a distant source in the presence of nearby ice cracking noise.

Now consider one of the three dimensional sound intensity arrays. Each element of the array is highly sensitive but as an array the output is the sound intensity vector at the centre of the array. The vector sum of the sound intensity at that field point will be zero over a carefully chosen (site specific) time interval, despite the high level of the pressure field as long as the noise emissions are random in origin. In other words, the high level background noise would read zero sound intensity. Any source in the area originating from a specific direction would add constructively and therefore be detectable even if it were weak. The standard signal processing techniques can still be applied to the data. For example, the intensity spectrum of the source can be analyzed to look for characteristic frequencies to distinguish different types of source emissions (whales, submarines, etc.) With the four arrays of the apparatus of FIG. 2, any known automatic focussing and range finding techniques (such as triangulation) can be employed by appropriate software control in the system computer 164 (of FIG. 3) utilizing the vectoral information of each array.

Figure 4:
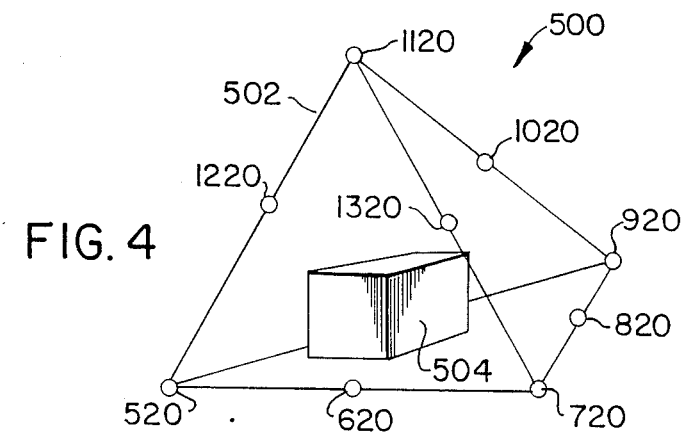
FIG. 4 is a perspective schematic of an alternate apparatus for use as an areal sound intensity receiver, shown surrounding an object.

FIG. 4 illustrates another apparatus 500 incorporating a number of the arrays 20 of FIG. 1. More particularly, arrays 520, 720, 920, and 1120 are supported at the corners of a tetrahedronal structure 502. Arrays 620, 820, 1020, 1220, 1320, and 1420 (hidden) are supported at the midpoints of the sides of the tetrahedronal structure. The tetrahedronal structure surrounds a submersed object 504. The control system for the device is identical to that depicted in FIG. 3 save that there are eight arrays of hydrophones with eight controllers associated therewith and blocks 158 and 160 are unnecessary since the apparatus 500 is stationary. With the areal sound intensity receiver of FIG. 3 (with the noted modifications) and FIG. 4, the total energy emitted from the object 504 may be monitored and changes in energy, which could be indicative of fatigue cracking, noted. This receiver is particularly suited to, for example, monitoring the energy flow from the base of an oil platform. Because of the directional nature of the information obtained by the receiver, the tetrahedronal structure need not be in close proximity to damaged welded joints in order to detect damage at such joints because triangulation may be employed to pinpoint the location of such joints.

The number of arrays along each side of the tetrahedronal structure is shown as three, however, an increased number along each side is possible and would have the effect of increasing the accuracy of the measurements.

While the areal sound intensity receivers of the example embodiments are adapted for measurement in water, it will be apparent to those skilled in the art that the receivers could be adapted for use in other media, such as air.

I claim:

1. A device for measuring the intensity of sound from an acoustic source in a medium comprising:
   (a) at least three microphone arrays spaced from each other, each of said microphone arrays comprising six microphones configured as three orthogonal pairs of microphones;
   (b) means for simultaneously sensing the output from each of said microphones in order to determine a real-time sound intensity vector at each of said microphone arrays; and (c) means for providing an indication of the areal intensity of sound through a notional plane bounded by at least three of said at least three microphone arrays.

2. The device of claim 1 wherein said microphones are spherical hydrophones.

3. The device of claim 2 including attitude and motion sensors for monitoring vibrational behaviour of said at least three microphone arrays.

4. The device of claim 3 wherein the distance between the microphones of each orthogonal pair of microphones in a microphone array is equivalent and wherein the acoustic centers of the three orthogonal pairs of microphones in a microphone array are coincident.

5. The device of claim 4 wherein said at least three microphone arrays comprise at least four microphone arrays and wherein the coincident acoustic centers of the at least four microphone arrays bound a notional square.

6. The device of claim 4 wherein said at least three microphone arrays comprise at least four microphone arrays and wherein the coincident acoustic centers of the at least four microphone arrays bound a notional tetrahedron.

7. The device of claim 1 including means for determining the range of, and direction to, an acoustic source.

8. A method of deriving a sound intensity vector field over an area in a medium comprising the steps of:
   (a) simultaneously sensing sound pressure in the medium at a plurality of points comprising at least three clusters of points, each cluster of points configured as three orthogonal pairs of points wherein the mid-points of the three orthogonal pairs of points of a cluster are coincident;
   (b) determining the sound intensity vector at the center of each of said clusters of points; and
   (c) determining an indication of the sound intensity vector field over an area bounded by at least three of said at least three clusters of points.

9. The method of claim 8 wherein step (c) includes monitoring the relative positions of said points.

* * * * *